April 19, 1960  L. G. ROLLINS  2,933,295
CUTTER BIT AND CHAIN BLOCK
Original Filed Sept. 25, 1957
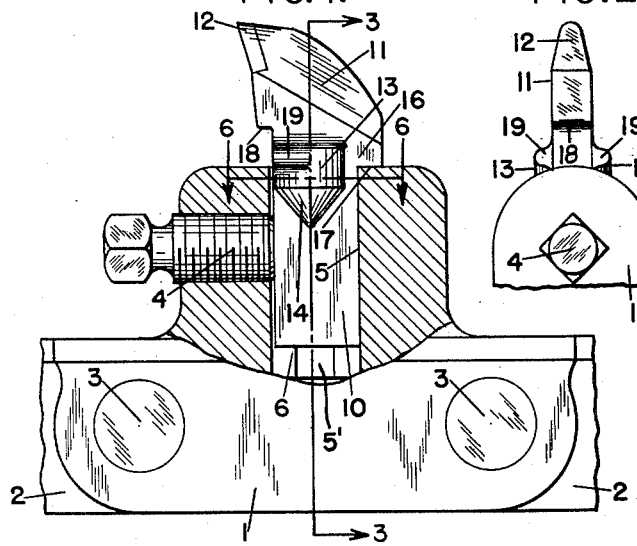
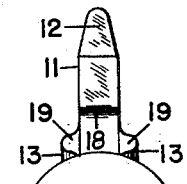
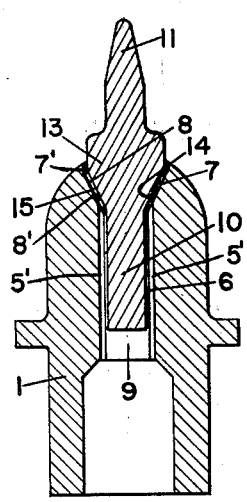
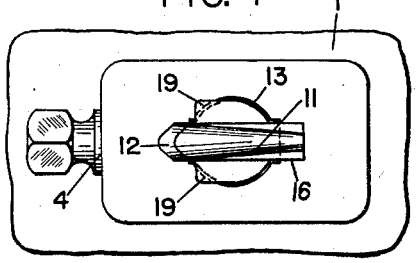
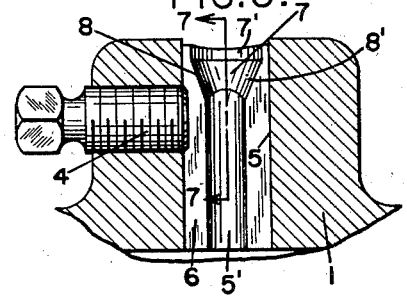
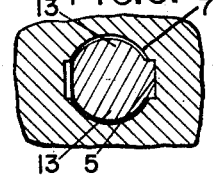
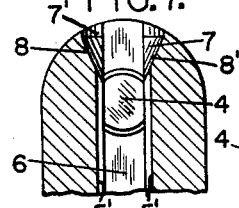
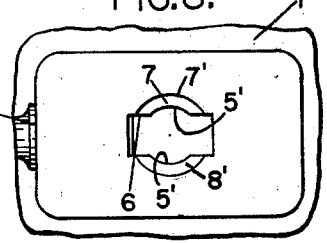
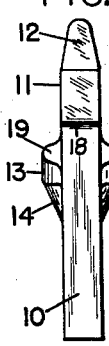
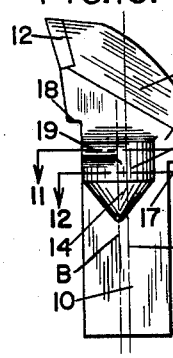
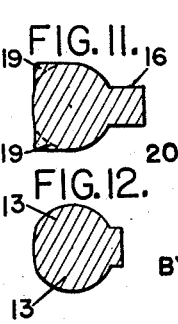
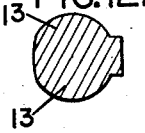
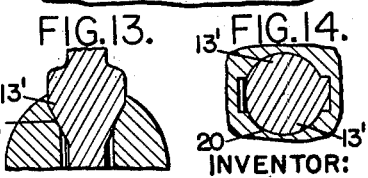
INVENTOR:
LESTER G. ROLLINS
BY Charles F. Osgood
ATTORNEY United States Patent Office 2,933,295
Patented Apr. 19, 1960

2,933,295

CUTTER BIT AND CHAIN BLOCK

Lester G. Rollins, Franklin, Pa., assignor to Joy Manufacturing Company, Pittsburgh, Pa., a corporation of Pennsylvania Continuation of application Serial No. 686,117, September 25, 1957. This application November 3, 1959, Serial No. 850,733

12 Claims. (Cl. 262—33)

This invention relates to a cutter bit and chain block structure and more particularly to a cutter bit and chain block especially designed for use in a mining machine cutter chain.

This application is a continuation of application Serial No. 686,117, now abandoned, which was filed September 25, 1957.

In cutter chains having chain blocks provided with conventional ½" x 1" sockets for receiving standard rectangular shaped shank cutter bits it has been found that under hard cutting conditions the cutter bits sometimes break at the juncture of the shanks with the integral cutting portions and frequently the broken shank pieces drop inwardly within the sockets into engagement with the teeth of the chain sprocket ofttimes causing damage to the latter. The present invention contemplates improvements over known types of cutter bits and chain blocks in that both the cutter bit and block are improved so as to reduce breakage to a minimum while still enabling the use of a standard shanked bit in the block-socket when desired. Also the bit enlargement prevents the dropping of a broken piece of the bit shank into contact with the sprocket teeth.

An object of the present invention is to provide an improved cutter chain. Another object is to provide an improved chain block and cutter bit structure especially designed for use with a mining machine cutter chain. Still another object is to provide an improved shank type cutter bit having an enlarged portion to reduce breakage at points where normal breakage of a standard bit occurs. Yet another object is to provide a special socket for a chain block whereby either a standard shanked bit or the special bit of the present invention may be received in the block-socket. A further object is to provide an improved shank type cutter bit having a portion of enlarged cross section thereon not only for reducing breakage but also to provide means to prevent a broken bit shank from dropping down in the block-socket into engagement with the teeth of the chain sprocket. A still further object is to provide such a special shank type bit with an enlargement thereon wherein the enlarged portion provides an abutment whereby a broken piece of bit shank may readily be removed from the block-socket. Another object is to provide an improved cutter bit and chain block structure which may be easily manufactured while utilizing a minimum of material, thereby substantially improving the bit and block structure without materially increasing its cost. These and other objects and advantages of the invention will, however, hereinafter more fully appear.

In the accompanying drawings there are shown for purposes of illustration one form and a modification which the invention may assume in practice.

In these drawings:

Fig. 1 is a side elevational view of the improved chain block and cutter bit, showing a portion of the block in longitudinal vertical section.

Fig. 2 is a fragmentary front end view of the chain block and cutter bit.

Fig. 3 is a cross section taken on line 3—3 of Fig. 1.

Fig. 4 is a top plan view of the block and bit shown in Fig. 1.

Fig. 5 is a fragmentary longitudinal section through the chain block of Fig. 1, with the cutter bit removed and showing the improved block-socket.

Fig. 6 is a detail transverse section taken on line 6—6 of Fig. 1.

Fig. 7 is a fragmentary cross section taken on line 7—7 of Fig. 5.

Fig. 8 is a top plan view of the block shown in Fig. 5.

Fig. 9 is a front elevational view and Fig. 10 is a side elevational view of the improved cutter bit.

Figs. 11 and 12 are detail sections taken respectively on lines 11—11 and 12—12 of Fig. 10.

Figs. 13 and 14 are detail sections taken through a block-socket and bit of modified construction.

The improved cutter bit and block structure of the present invention, as shown in the drawings, is associated with a mining machine cutter chain having chain blocks 1 pivotally connected to strap links 2 by hinge pins 3. Standard chain blocks have ½" x 1" sockets for receiving the rectangular shanks of standard cutter bits, and set screws 4 threaded within the block lugs serve to secure the plane rear surface of each bit shank against the plane rear surface or wall 5 of the block-socket. The block-socket is usually formed by boring a hole of circular cross section and thereafter broaching the socket into generally rectangular shape, thus leaving curved side recesses 5' coextensive with the rectangular portion of the socket. The block lugs may have threaded openings at its opposite ends selectively to receive the set screw and the bit shank may be reversed in position in the block socket so that the cutter chain may cut in either of opposite directions in the manner disclosed in Patents Nos. 2,186,-502, 2,394,813 and 2,511,132, all owned by the assignee of the present invention. In chain blocks and cutter bits of a standard design there is some bit breakage, particularly during hard cutting, at points on the bit shank close to the outer surface of the block lugs and in the special structure of the present invention such breakage has been materially reduced, while permitting the use of standard shanked bits in the block-sockets when desired.

As shown most clearly in Figs. 3, 5 and 8, the ½" x 1" rectangular bit receiving socket 6 of the chain block is enlarged in cross section at 7 at its outer portion and this enlargement is circular in cross section at 7' at its outer portion and at its inner portion at 8' is desirably in the form of a taper or of frusto-conical shape likewise circular in cross section and having inclined walls 8 which extend along lines converging inwardly toward a point lying at the axial center of the bit shank and merge with the walls of the inner rectangular socket portion 9. The socket enlargement is of a width substantially twice the width of the rectangular socket, as shown in Fig. 3.

The improved cutter bit shown in Figs. 9 and 10 comprises a rectangular shank portion 10 and an outer integral cutting portion 11, the latter supporting a hard metal cutting tip or point 12. The cutter bit body near the juncture of the cutting portion of the bit shank is enlarged in cross section at 13, desirably of frusto-conical or tapered shape provided with inwardly converging walls 14. This enlargement is desirably offset forwardly of the bit shank from the axial center of the shank so that when the cutter bit is inserted in the block-socket it tends to move rearwardly to bring the rear surface of the shank against the rear wall 5 of the block-socket. The parallel axial center lines of the bit shank 10 and the bit enlargement 13 are respectively designated A and B in Fig. 10. By offsetting the bit enlargement 13, 14 slightly forwardly of the longitudinal median line of the bit shank it is possible to bring the bit enlargement into substantial coaxial relation with the outer socket enlargement when the cutter bit is firmly secured in position by the set screw, as shown in Fig. 6. Also, the offset bit enlargement enables positioning of the cutter bit in reversed positions within a reversible chain block of the type disclosed in the patents referred to, as is well-known in the art. There is desirably clearance at 15 (Fig. 3) between the tapered bit enlargement and the tapered socket walls. The cutting portion of the bit provides a rear lug portion 16 having an inner plane surface 17 adapted to rest against the exterior of the block lug (Fig. 1) to limit inward movement of the bit shank within the block-socket. A forward shoulder 18 on the cutting portion of the bit may be used as an abutment to facilitate removal of the cutter bit from the block-socket. The bit enlargement has side projections 19 which provide abutments against which blows may be imparted or pressure may be applied for removing the broken shank portion of a bit from the block-socket.

In the modification shown in Figs. 13 and 14 the tapered or frusto-conical enlargement 13' is the same as that of the preferred embodiment but in this instance is formed to provide a tight fit at 20 with the tapered socket walls thereby to provide additional support for the cutter bit to reduce breakage. Otherwise this embodiment is the same as that above described.

As a result of this invention an improved cutter bit and chain block structure is provided whereby in an extremely simple manner and with a minimum of change, a standard block and cutter bit are substantially improved. The improved block structure with the special socket shape is also designed to receive a standard shank type cutter bit. By the provision of the bit enlargement at points wherein a standard bit sometimes breaks, breakage even during hard cutting conditions is substantially reduced. Also the improved bit enlargement prevents the dropping of a broken bit shank inwardly within the socket into engagement with the teeth of the chain sprocket, and provides abutments whereby a broken shank may readily be driven up out of the block-socket. These and other advantages of the invention will be clearly apparent to those skilled in the art.

While there are in this application specifically described one form and a modification which the invention may assume in practice, it will be understood that this form and modification of the same are shown for purposes of illustration and that the invention may be further modified and embodied in various other forms without departing from its spirit or the scope of the appended claims.

What I claim as new and desire to secure by Letters Patent is:

1. In a cutter chain, a chain block having a socket, said socket having a major portion of rectangular cross section providing a plane rear wall and curved side recesses extending coextensive therewith, said socket provided with a later enlargement only near its outer portion with said enlargement extending laterally beyond said side recesses, and a cutter bit received in said rectangular socket having a shank and an integral cutter supporting portion, said bit having a lateral enlargement near the juncture of said cutter supporting portion with said shank, said enlargement received in said socket enlargement, said enlarged portions of said socket and cutter bit each being of circular cross section at its outer portion and of frusto-conical shape at its inner portion with said socket and bit enlargements disposable in substantially interfitting relationship when said bit is in cutting position on the chain block, and means on said block for securing said bit shank in said socket with its rear surface in contact with the rear socket wall.

2. A cutter chain as set forth in claim 1 wherein the surface of the bit enlargement has slight clearance between the same and the socket enlargement walls when said bit shank is held against said rear socket wall, and said bit enlargement not only strengthens the bit but also serves as a stop to prevent the shank portion from dropping down through the socket in the event the bit breaks at or near the juncture of said cutting portion with said rectangular shank.

3. In combination, a chain block having a socket, said socket being generally rectangular in cross section with curved side enlargements having concave walls lying in the surface of a cylinder whose axial line lies midway between the front and rear socket walls, said socket having a coaxial enlargement of circular cross section only at its outer portion, a cutter bit having a shank of generally rectangular cross section and an integral cutter supporting portion, said bit having an enlargement of circular cross section at the juncture of said shank with said cutter supporting portion, said enlargement being offset slightly forwardly of the axial center line of said bit shank and said rectangular shank being of slightly smaller dimensions than said rectangular socket so that when the bit shank is in engagement with the rear socket wall there is a slight clearance between the front socket wall and the front face of the bit shank, and means on said block engaging the front shank face for securing said bit in cutting position on said block, said circular enlargement of said bit when the latter is secured in cutting position on said block being disposed in said socket enlargement substantially coaxial with the cylinder in whose surface said curved side walls lie.

4. A combination as set forth in claim 3 wherein said socket only at its outer portion which is enlarged to receive said bit enlargement has a tapered lower portion lying in the surface of a cone and said bit enlargement has a complementary tapered surface which substantially fits said tapered socket portion.

5. In combination, a chain block having a socket extending perpendicularly to the inner guiding face of said block, said socket being rectangular in cross section with an enlarged axial bore of circular cross section cutting into the rectangle midway between its front and rear end walls so as to provide curved side enlargements laterally cutting into the side walls of the rectangle, said socket having a lateral enlargement near its outer portion, a cutter bit having a shank of rectangular cross section and an integral cutter supporting portion, said bit having an enlargement of circular cross section at the juncture of the shank with said cutter supporting portion, said enlargement being receivable in said socket enlargement and being offset slightly forwardly of the axial center line of said bit shank, and said rectangular shank being of slightly smaller dimensions than said rectangular socket so that when the bit shank is in engagement with the rear socket wall there is a slight clearance between the front socket wall and the front face of the bit shank, and means on said block engaging the front shank face for securing said bit in cutting position on said block, said circular enlargement of said bit when the latter is secured in cutting position on said block being disposed in said socket enlargement substantially coaxial with the axial bore which provides the curved sides of the socket.

6. A combination as set forth in claim 5 wherein said socket enlargement has a tapered lower portion lying in the surface of a cone and said bit enlargement has a complementary tapered surface which substantially fits said tapered socket portion but with slight clearances.

7. In combination, a chain block having a socket of generally rectangular shape in cross section, said socket having a lateral enlargement only at its outer portion with said socket enlargement of a width substantially twice the width of said rectangular socket, a cutter bit having a shank of generally rectangular cross section and an integral cutter supporting portion, said bit having an enlargement at the sides thereof intermediate the front and rear faces of said rectangular shank, said bit enlargement located at the juncture of said shank with said cutter supporting portion and being offset slightly forwardly of the axial center line of said bit shank, said rectangular bit shank being of slightly smaller dimensions than said rectangular socket so that when the bit shank is in engagement with the rear socket wall there is a slight clearance between the front socket wall and the front face of the bit shank, and means on said block engaging the front shank face for securing said bit in cutting position on said block, said enlargement of said bit when the latter is secured in cutting position on said block being disposed in said socket enlargement with the median line of the bit enlargement substantially aligned with the longitudinal median line of said block-socket.

8. A combination as set forth in claim 7 wherein said bit enlargement has an upper portion of circular cross section and a lowered tapered portion and said socket enlargement being of generally similar shape so that the bit enlargement is received within said socket enlargement with at least only a small amount of clearance thereabout.

9. In combination, a chain block having a socket, said socket being laterally enlarged only at its outer portion with the socket enlargement being substantially as great as the breadth of said socket, a cutter bit having a shank and an integral cutter supporting portion, said bit being laterally enlarged at the juncture of said shank with said cutter supporting portion with said enlargement extending inwardly a short distance along the shank, said bit enlargement being offset slightly forwardly of the axial center line of the bit shank and said shank being of slightly smaller dimensions than said socket so that when the bit shank is in engagement with the rear socket wall there is a slight clearance between the front socket wall and the front face of the bit shank, and means on said block engaging the front shank face for securing said bit in cutting position on said block, said enlargement of said bit when the latter is secured in cutting position on said block being disposed in said socket enlargement with the median line of said bit enlargement substantially aligned with the longitudinal median line of said socket.

10. A cutter bit having a shank and an integral cutter supporting portion, said bit also having an integral and lateral enlargement lying between the front and rear surfaces of said shank and projecting laterally from the sides of said shank, said enlargement at its inner portion being of frusto-conical shape and of generally circular shape in cross section, said enlargement disposed only at the juncture of said cutter supporting portion with said shank at the outer portion of the latter for increasing the cross section of the bit at such point, said shank along the major portion of its length inwardly of its enlargement being of relatively uniform cross section to fit a block-socket, said bit enlargement being slightly offset forwardly of the axial center line of the bit shank whereby when the bit is secured in either of reversed cutting positions on a chain block said enlargement is positioned substantially centrally within a corresponding enlargement of the block-socket.

11. A cutter bit comprising, a cutter body having a shank portion and an outer portion, said outer portion terminating in a cutter tip, said cutter body having a laterally enlarged cross section at the juncture of said outer portion and said shank portion, and said laterally enlarged cross section having a tapering contour which taper is rearward toward said shank portion.

12. A cutter bit comprising, a cutter body having a shank portion and an outer portion, said outer portion terminating in a cutter tip, said cutter body having a laterally enlarged cross section at the juncture of said outer portion and said shank portion, and said laterally enlarged cross section is circular in cross section terminating into a frusto-conical portion that tapers into said shank portion.

References Cited in the file of this patent

UNITED STATES PATENTS

| Number | Name | Date |
|---|---|---|
| 894,184 | Buel | July 28, 1908 |
| 1,777,515 | Cartlidge | Oct. 7, 1930 |